No. 743,931. PATENTED NOV. 10, 1903.
W. W. ROSENFIELD.
COIN CONTROLLED MACHINE.
APPLICATION FILED DEC. 13, 1900.
NO MODEL. 2 SHEETS—SHEET 1.
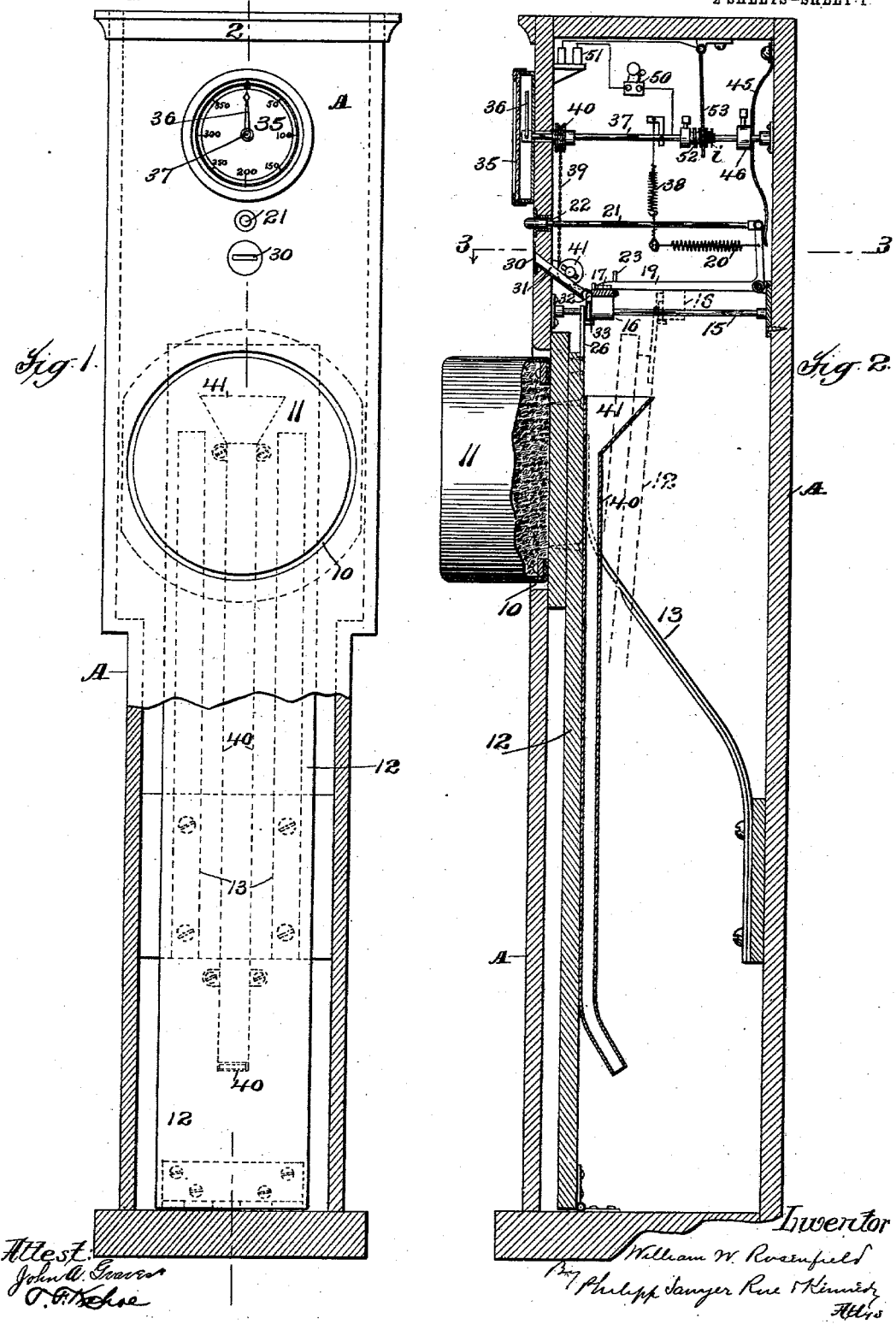

No. 743,931. PATENTED NOV. 10, 1903.
W. W. ROSENFIELD.
COIN CONTROLLED MACHINE.
APPLICATION FILED DEC. 13, 1900.
NO MODEL. 2 SHEETS—SHEET 2.
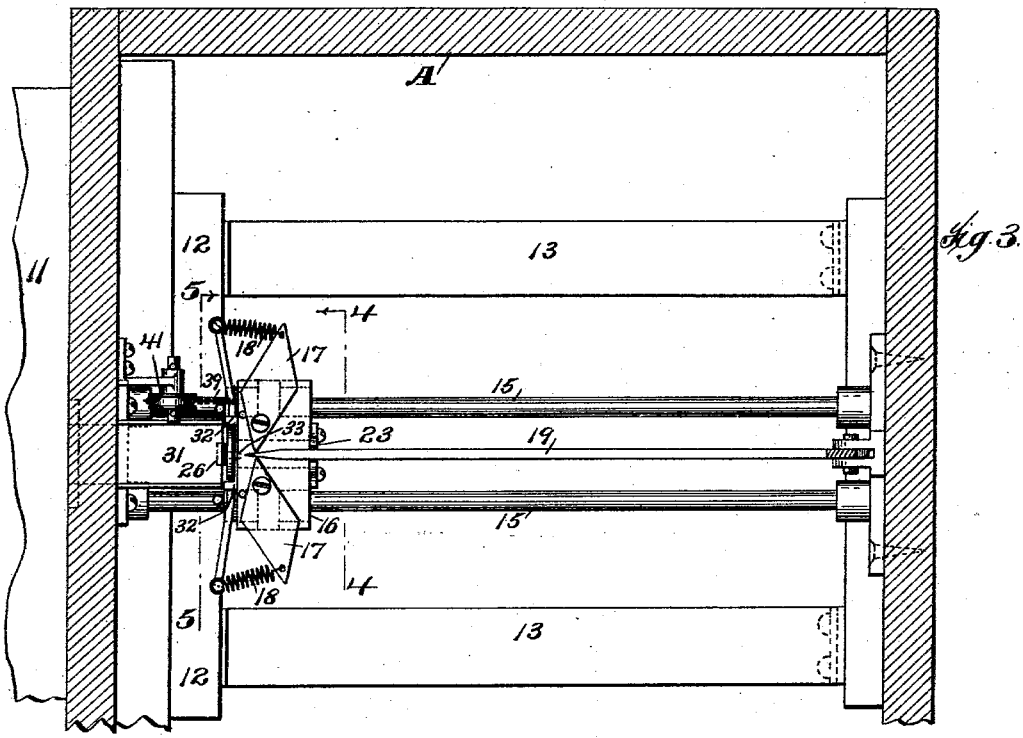
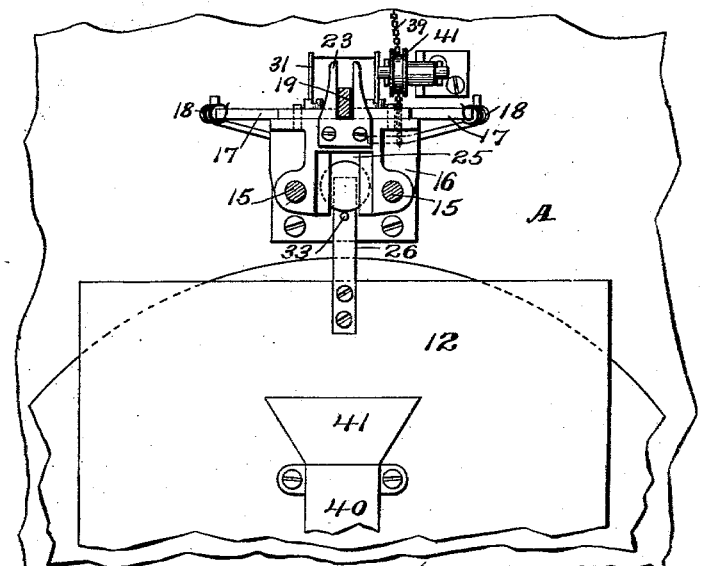
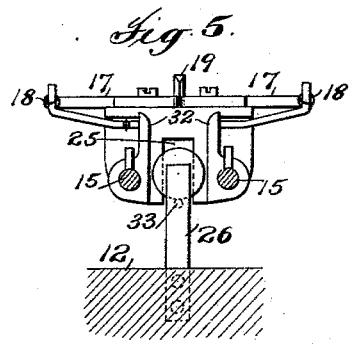
Inventor:
William W. Rosenfield No. 743,931. Patented November 10, 1903.

UNITED STATES PATENT OFFICE.

WILLIAM W. ROSENFIELD, OF NEW YORK, N. Y.

COIN-CONTROLLED MACHINE.

SPECIFICATION forming part of Letters Patent No. 743,931, dated November 10, 1903.

Application filed December 13, 1900. Serial No. 39,657. (No model.)

*To all whom it may concern:*

Be it known that I, WILLIAM W. ROSENFIELD, a citizen of the United States, residing at New York city, county of New York, and State of New York, have invented certain new and useful Improvements in Coin-Controlled Machines, fully described and represented in the following specification and the accompanying drawings, forming a part of the same.
This invention relates to coin-controlled machines, and more especially to coin-controlled machines for testing a person's striking or punching power, and the invention aims generally to improve the construction of such machines.

As a full understanding of the invention can best be given by a detailed description of a preferred construction embodying the various features of the invention, such a description will now be given in connection with the accompanying drawings, showing such a preferred construction.

In said drawings, Figure 1 is a front view, partly in section, of a punching-machine constructed in accordance with my invention. Fig. 2 is a section taken on line 2 of Fig. 1. Fig. 3 is a section, partly broken away, taken on line 3 of Fig. 2 and on an enlarged scale. Figs. 4 and 5 are detail sectional views taken on lines 4 and 5, respectively, of Fig. 3. Figs. 6 and 7 are detail views of the circuit-closing device.

Referring to the drawings, A represents the casing of the machine within and upon which the various operative parts are mounted. The front wall of the casing is formed with an opening 10, through which extends the punching-pad 11, which is carried by a suitable support arranged within the casing, so as to be capable of being moved backward against yielding tension. As here shown and as preferred, the pad is carried by a swinging support 12, which is pivoted at or near the bottom of the casing and is held in its normal forward position by means of a spring 13, against the tension of which it may be swung backward, as indicated in dotted lines.

Mounted on suitable guides or ways, as the rods 15, extending substantially in the direction of the movement of the upper end of the swinging support 12, there is a sliding block 16. On its upper face this sliding block carries a pair of pawls 17, under tension of springs 18, to bear on the opposite sides of a bar 19, so that as the block 16 is moved from front to rear the pawls will yield and their gripping edges will slide along the bar 19, but will at all times act to prevent any forward or return movement of the block 16 so long as the bar 19 is in position between the points. The pawls 17 also act as a spring friction device to prevent overthrow of the block 16. For releasing the block for its return movement the bar 19 is pivotally mounted at the rear of the casing, so as to be capable of being thrown upward out of the grip of the pawls 17. It is normally held in operative position by means of a spring 20 and is thrown upward against the tension of the spring by means of a push-rod 21, extending through an opening 22 in the front wall of the casing. To provide for its return to operative position between the pawls, the bar is of such a length that when the slide 16 is in its extreme forward position the end of the bar will lie just behind the gripping-points of the pawls, and the end of the bar is tapered, so that on the block being moved back it will enter readily between the pawls. The block 16 is provided with a slotted plate 23, which serves as a guide for the bar 19.

The under side of the block 16 is cut away to form a slot 25, and the swinging support 12 is provided with a finger 26 in position to pass through the slot 25 on the rearward movement of the support when nothing has been interposed between the block and the finger. If, however, a coin or other suitably-sized article be in position before the face of the block 16 as the support swings backward, the finger 26 will come in contact with such coin and will thereby cause the block 16 to move rearwardly.

A coin-slot 30 is provided in the front of the casing, and from it leads a chute 31, by which the coin is directed into position against the front face of the block 16, the front face of the block being preferably formed with a groove, the sides 32 of which form guides for the coin. To prevent the coin from dropping below the face of the block 16, a support 33 is preferably provided on the finger 26.

The indicating mechanism comprises, preferably, a dial 35, mounted on the front of the casing, and an indicating-finger 36, carried by a shaft 37, held in its normal position, with the indicator pointing to the zero-point of the dial, by means of a spring 38. The shaft is rotated against the tension of the spring by means of a chain or cord 39, leading from a drum 40 on the shaft about a guide-wheel 41 to the sliding block 16, so that when the block 16 is moved rearwardly the shaft 37 will be rotated and the pointer 36 caused to move on the dial to indicate in pounds the force of the blow on the punching-pad.

In order to prevent overrotation of the shaft 37, a suitable friction device is provided, preferably a spring 45, in position to bear on a collar 46 on the shaft. The spring 45 is preferably connected with the push-rod 21, as by having its free end extended to be engaged by the end of the rod 21 or the upwardly-extending arm of the bar 19, so that when the rod 21 is pushed inward for releasing the block 16 the shaft 37 will at the same time be freed from the friction of the spring 45. By making the spring 45 sufficiently strong it may be made to serve as a means to prevent return movement of the shaft 37 and also of the slide 16, and thus take the place of the spring-pawls 17.

I preferably provide an automatic signaling device whereby when the indicating-finger is moved to indicate a blow of a certain force—as, say, three hundred pounds on the dial shown—a signal will be made. For this purpose I preferably provide an electric signaling device having a circuit passing through a bell 50 and a battery 51 and through a circuit-closer controlled by the movement of the shaft 37. Any suitable form of circuit-closer may be employed; but I preferably provide a screw-threaded sleeve 52 on the shaft 37 and a contact-finger 53, the threaded portion of the sleeve having an insulated part $i$, on which the contact-finger rests when the shaft is in position with the indicating-finger at zero and until the shaft has been rotated to move the indicating-finger to the position at which the signal is to be made. The contact-finger then coming in contact with the conducting portion of the thread the circuit will be completed and the bell or other signaling device operated. With a circuit-closing device of this form the circuit will be kept closed during further rotation of the shaft even though more than a complete rotation be made and until the shaft rotates back to move the conducting portion of the screw-thread away from the contact-finger.

The operation of the machine is briefly as follows: When a coin is introduced through the slot 30, it will pass down the chute 31 and come to rest on the pin 33, between the face of the block 16 and the finger 26. Then when the support 12 is swung rearwardly by the force of a blow on the pad 11 the finger 26, acting on the block 16 through the coin, will cause the block to move rearwardly a distance corresponding to the force of the blow, and the finger 36 will be caused to move on the dial 35 a distance corresponding to the movement of the block 16, and so to indicate the force of the blow. As the support 12 begins to swing forward again under the action of the spring 13 the block 16 will remain in the position to which it has been moved, being held there by the grip of the pawls 17 on the bar 19 or by the friction-spring 45 bearing on the collar 46, and the indicating mechanism will thus continue to show the force of the blow. As the finger 26 moves away from the block 16 the coin will fall from between the block and the finger, so that if the pad be now again struck its movement can have no effect on the indicating mechanism, as the finger will pass freely through the slot 25 in the block. Before the machine can be again operated the block must be released by moving the push-rod 21 inward, whereby the bar 19 will be raised from between the pawls 17 and the spring 45 will be moved away from the collar 46, and the block 16 will then be returned to its forward normal position by the spring 38 acting through the shaft 37 and chain 39, and the indicating-finger 36 will be returned to the zero-point. A guide-tube 40 with a funnel-shaped mouth 41 is preferably carried by the swinging support 12 to guide the coins as they drop from between the finger 26 and the block 16.

It will be understood that I am not to be limited to the exact construction shown in the drawings and to which the foregoing description has been mainly confined, but that the invention includes changes therein within the claims. It will be understood also that features of the invention as claimed may be used in connection with machines of other form or for other purposes than that shown.

It will be understood also that by the term "coin" as used in the claims I intend to include other disks or other suitably-shaped pieces of metal or other suitable material which may be used in the constructions claimed.

What I claim is—

1. In a coin-operated machine, the combination of a movable member, a second movable member adapted to be moved by the first movable member only when a coin has been introduced between said members, means for supporting a coin between said members when they are in their normal position, indicating mechanism, means for controlling the movement of the indicating mechanism according to the amount of movement of the second movable member, means for preventing return movement of the second movable member from any position to which it is moved by the first movable member, said movable members being formed to release the coin when the first movable member moves back to its normal position and permit its discharge from between said members, and means for releasing the second movable member for its return movement, substantially as described.

2. In a coin-operated machine, the combination of a movable member, a second movable member adapted to be moved by the first movable member only when a coin has been introduced between said members, means for supporting a coin between said members when they are in their normal position, means for preventing return movement of the second movable member from any position to which it is moved by the first movable member, said members being formed to release the coin when the first movable member moves back toward its normal position and permit its discharge from between said members, and means for releasing the second movable member for its return movement, substantially as described.

3. In a coin-operated machine, the combination of a movable member, a second movable member adapted to be moved by the first movable member only when a coin has been introduced between said members, means for supporting a coin between said members when they are in their normal position, means for preventing return movement of the second movable member from any position to which it is moved by the first movable member, said members being formed to release the coin when the first movable member moves back toward its normal position and permit its discharge from between said members, and means independent of the first movable member for returning the second movable member to normal position, substantially as described.

4. In a coin-operated machine, the combination of a movable member, a second movable member adapted to be moved by the first movable member only when a coin has been introduced into the machine, a bar extending longitudinally of the direction of movement of the second movable member, a gripping device carried by the second movable member adapted to coact with said bar to prevent return movement of said movable member, and means for moving said bar out of engagement with the gripping device, substantially as described.

5. In a coin-operated machine, the combination of a movable member, a sliding block 16 adapted to be moved by said member only when a coin has been introduced between said block and said member, spring-actuated pawls 17 mounted on said block, a bar 19 for coacting with said pawls, a push-rod 21 for moving the bar 19 out of engagement with the pawls, and means for returning the block 16 to its normal position, substantially as described.

6. The combination with the indicating mechanism of a coin-operated machine, of coin-controlled means for operating the indicating mechanism, and an electric signaling device having a circuit-closer comprising a contact-finger 53 and a screw-threaded sleeve 52 rotated by the movement of the indicating mechanism and which has an insulated portion $i$, substantially as described.

7. The combination with the indicating device of a coin-operated machine, of coin-controlled means for operating the indicating mechanism, and a signaling device whereby a signal will be made when the indicating mechanism has made a certain movement and will be continued during the further movement of the indicating mechanism, substantially as described.

In testimony whereof I have hereunto set my hand in the presence of two subscribing witnesses.

WILLIAM W. ROSENFIELD.

Witnesses:
   A. L. KENT,
   A. A. V. BOURKE.